(12) United States Patent
Frederiksen et al.

(10) Patent No.: US 8,396,030 B2
(45) Date of Patent: Mar. 12, 2013

(54) SELECTING BETWEEN NORMAL AND VIRTUAL DUAL LAYER ACK/NACK

(75) Inventors: Frank Frederiksen, Klarup (DK); Troels E. Kolding, Klarup (DK); Xiang Guang Che, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 340 days.

(21) Appl. No.: 12/459,352

(22) Filed: Jun. 30, 2009

(65) Prior Publication Data
US 2009/0323613 A1 Dec. 31, 2009

Related U.S. Application Data

(60) Provisional application No. 61/133,476, filed on Jun. 30, 2008.

(51) Int. Cl.
H04W 4/00 (2009.01)
H04B 7/216 (2006.01)
H04K 1/10 (2006.01)

(52) U.S. Cl. ......... 370/329; 370/335; 370/338; 375/260

(58) Field of Classification Search ........... 370/329–335
See application file for complete search history.

(56) References Cited

U.S. PATENT DOCUMENTS

2008/0192847 A1* 8/2008 Classon et al. ................ 375/260
2008/0205348 A1* 8/2008 Malladi ......................... 370/335

OTHER PUBLICATIONS

Korean Office Action issued in connection with Korean Patent Application No. 10-2011-7002550 filed on Jun. 30, 2009, prepared on Nov. 16, 2011.

Texas Instruments, Multiple ACK/NACK Transmission in TDD, 3GPP RAN R1-082489 (published on Jun. 24, 2008).
Korean Laid-open Patent Publication No. 1989-9121 (published on Jul. 13, 1989).
"$3^{rd}$ Generation Partnership Project; Technical Specification Group Radio Access Network; Evolved Universal Terrestrial Radio Access (E-UTRA); Physical Layer Procedure (Release 8)", 3GPP TS 36.213 V8.0.0, May 2008, 45 pages.
TSG-RAN WG1 #52, "Multiple ACK/NAK for TDD", Sorrento, Italy, Feb. 11-15, 2008.
3GPP TSG RAN WG1 #53b, "Multiple ACK/NAK Transmission in TDD", R1-082489, Warsaw, Poland (Jun. 30-Jul. 4, 2008) (5 pages).
3GPP TSG RAN WG1 Meeting #53bis, "Multi-bots ACK/NACK Signalling for LTE TDD", R1-082589 Warsaw, Poland (Jun. 30-Jul. 4, 2008) (5 pages).
3GPP TSG RAN WG1 Meeting #53, "Some Considerations on Bundled and Multiplexing ACK Transmission in TDD", R1-081940, Kansas City, USA (May 5-9, 2008) (4 pages).
3GPP TSG RAN WG1 Meeting #53bis, "Multiple A/Ns Transmission for TDD", R1-082567, Warsaw, Poland, (Jun. 30-Jul. 4, 2008) (3 pages).

(Continued)

*Primary Examiner* — Brandon Renner
(74) *Attorney, Agent, or Firm* — Harrington & Smith

(57) ABSTRACT

An allocation of downlink resources is received, which are monitored on l layers for data. A resource-specific bit (ACK/NACK) is generated for each of those resources. From a pattern of those resources is selected an algorithm from among a first algorithm that bundles them in a first mode and a second algorithm that bundles them in a second mode. The selected algorithm is used on the generated resource-specific bits that correspond to the downlink resources, bundled according to the selected mode, to generate l reply bits which are then transmitted. At the network side a NACK reply bit is received, based on a pattern of the allocated downlink resources, a first algorithm that bundles them in a first mode or a second algorithm that bundles them in a second mode is selected. A bundling window and layer combination are determined from the selected algorithm, which gives the resource for retransmitting the NACK'd data.

20 Claims, 2 Drawing Sheets

OTHER PUBLICATIONS

3GPP TSG RAN1#52-bis, "Uplink ACK/NACK for TDD", R1-081292, Shenzhen, China (Mar. 31-Apr. 4, 2008) (4 pages).

"3rd Generation Partnership Project; Technical Specification Group Radio Access Network; Evolved Universal Terrestrial Radio Access (E-UTRA); Physical Layer Procedure (Release 8)", 3GPP TS 36.213 V8.0.0, Sep. 2007, 13 pgs.

TSG-RAN WG1 #52, "Multiple ACK/NAK for TDD", R1-081110, Sorrento, Italy, Feb. 11-15, 2008.

Texas Instruments "Support of Multiple ACK/NAK Transmission in TDD"; R1-081988; 3GPP TSG RAN WG1 #53, Kansas City, MO, USA, May 5-May 9, 2008; pp. 1-3.

3GPP TS 36.213 V8.3.0 (May 2008) "3rd Generation Partnership Project; Technical Specification Group Radio Access Network; Evolved Universal Terrestrial Radio Access (E-UTRA); Physical layer procedures (Release 8)"; 3GPP support office address, 650 Route des Lucioles—Sophia Antipolis, Valbonne—France; pp. 1-45.

* cited by examiner

SELECTING BETWEEN NORMAL AND VIRTUAL DUAL LAYER ACK/NACK

CROSS REFERENCE TO RELATED APPLICATIONS

This patent application claims priority under 35 U.S.C. §119(e) from Provisional U.S. Patent Application No. 61/133,476, filed Jun. 30, 2008, the disclosure of which is incorporated by reference herein in its entirety. The subject matter disclosed herein is related to that of Provisional U.S. Patent Application No. 61/029,361 which is co-owned with this application.

TECHNICAL FIELD

The teachings herein relate generally to control signaling in wireless networks, and particular embodiments detail ACK/NACK signaling for data received in grouped downlink resources.

BACKGROUND

The following abbreviations and terms are herewith defined:

| | |
|---|---|
| 3GPP | third generation partnership project |
| ACK | acknowledgement |
| DL | downlink |
| DTX | discontinuous transmission |
| eNB | Base Station/Node B of an LTE system |
| E-UTRAN | evolved UTRAN |
| FDD: | frequency division duplex |
| H-ARQ | hybrid automatic repeat (or retransmission) request |
| LTE | long term evolution of 3GPP (also known as 3.9G) |
| MCS | modulation and coding set (or scheme) |
| MIMO | multiple input multiple output (related to antenna configuration) |
| NACK | negative ACK |
| Node B | base station or similar network access node |
| OFDM | orthogonal frequency division multiplex |
| PDCCH | physical downlink control channel |
| PDSCH | physical downlink shared channel |
| PMI | precoding matrix index |
| PRB | physical resource block |
| PUCCH | physical uplink control channel |
| PUSCH | physical uplink shared channel |
| TDD | time division duplex |
| UE | user equipment (e.g., mobile equipment/station) |
| UL | uplink |
| UMTS | universal mobile telecommunications system |
| UTRAN | UMTS terrestrial radio access network |

3GPP is standardizing the long-term evolution (LTE) of the radio-access technology which aims to achieve reduced latency, higher user data rates, improved system capacity and coverage, and reduced cost for the operator. The current understanding of LTE relevant to these teachings may be seen at 3GPP TR 36.213 v8.3.0 (2008-05) entitled PHYSICAL LAYER PROCEDURES (RELEASE 8), which is attached to the priority document as Exhibit A. Both FDD and TDD are considered in LTE, and the non-limiting examples of the invention detailed below are described within the context of the TDD mode.

Allocations of radio resources are given in LTE on the PDCCH. A particular UE listens to the PDCCH at its designated time and sees if it is allocated UL and/or DL resources. If this is the case, the UE maps the allocation information in the PDCCH to the PDSCH or PUSCH as the case may be. In the case of an UL allocation, the UE sends its data on the allocated UL resource and maps that resource to a control channel where it listens for the eNB's ACK/NACK for the UL data. In the case of a DL allocation, the UE tunes to the mapped DL resource and monitors for data from the eNB, and maps that DL resource to a control channel where it then sends its ACK/NACK for the DL data (specifically, the lowest control channel element index of the PDCCH which carries the DL control information DCI maps to the UL channel which carries the ACK/NACK). Each PDCCH gives multiple allocations, and the typical scenario is that there will be more DL allocations than UL in a given PDCCH. These teachings assume that typical scenario.

LTE reduces control signalling in certain instances as compared to prior wireless protocols in order to conserve radio resources for the transfer of user data, and also to more efficiently use the UE's limited power supply. As noted above, LTE allows a frame configuration in which there are more DL subframes than UL subframes, which causes difficulty for one-to-one mapping of the allocated resource to its ACK/NACK. One way to address these issues is to send a single ACK/NACK for data received over a group of DL resources. Reference in this regard may be had to document R1-081110 (3GPP TSG-RAN WG1 #52, Sorrento, Italy, Feb. 11-15, 2008, by Ericsson, Motorola, Nokia, Nokia Siemens Networks and Qualcomm) entitled Multiple ACK/NACK for TDD and attached to the priority document as Exhibit B. That document states that for LTE it is agreed that UL hybrid-ARQ acknowledgements in TDD can be transmitted as a single ACK/NACK feedback where ACK/NACKs from one or several DL subframes are combined. This is termed 'bundling' the ACKs/NACKs, and is performed by a logical AND operation on the ACKs/NACKs for the various DL resources to generate a single ACK/NACK report, which allows the PUCCH formats already defined for LTE to be reused (PUCCH Format 1/1A/1B). This ACK/NACK mode has broadly been named "AN-bundling" (where AN is short for ACK/NACK). It is to be hard-coded (from specifications; e.g., TS 36.213 at Exhibit A of the priority document) as to which DL subframes are jointly acknowledged in which UL subframe, and thus depends on which TDD configuration is active.

When a UE is configured for dual layer reception (e.g. MIMO), it carries two bits on its uplink ACK/NACK channel. These bits are needed to acknowledge each of the layers (the term layers and streams are used interchangeably). However, if the UE is not assigned exactly the same PRB resources (or transmission parameters) in all subframes within the ACK/NACK bundling window it will have limited correlation between subframes for a certain layer (or stream), in which case a bundled ACK/NACK of such stream becomes meaningless.

The inventors have recognized this previously and determined that for the above case it would be better to use those two bits for creating smaller sub-bundling windows to achieve a gain. Such sub-bundling has been described for single stream case by the inventors in U.S. Provisional Patent Application Ser. No. 61/029,361 entitled "Virtual Dual-Stream Transmission to Reduce PDCCH Reliability Problem for Downlink-Heavy LTE TDD", attached to the priority document as Exhibit C.

The above-referenced provisional patent application considers how to configure a UE to do virtual dual-stream transmission and describes that it could be integrated with MIMO. Higher layer configuration may be used in order to optimize the use of the bits.

SUMMARY

In a first aspect thereof the exemplary embodiments of this invention provide a method comprising: receiving an allocation of downlink resources and monitoring the allocated downlink resources on l layers for data (l is a positive integer); generating a resource-specific bit for each of the respectively monitored allocated downlink resources; based on a pattern of the allocated downlink resources, selecting from among at least a first algorithm that bundles the downlink resources in a first mode and a second algorithm that bundles the downlink resources in a second mode; using the selected first or second algorithm on the generated resource-specific bits that correspond to the downlink resources as bundled according to the respective first or second mode to generate l reply bits; and transmitting the generated l reply bits.

In a second aspect thereof the exemplary embodiments of this invention provide an apparatus comprising at least one receiver, at least one processor and at least one transmitter. The at least one receiver is configured to receive an allocation of downlink resources and to monitor the allocated downlink resources on l layers for data (l is an integer). The at least one processor is configured to generate a resource-specific bit for each of the respectively monitored allocated downlink resources; and to select from among at least a first algorithm that bundles the downlink resources in a first mode and a second algorithm that bundles the downlink resources in a second mode, in which the selection is based on a pattern of the allocated downlink resources; and the processor is further configured to use the selected first or second algorithm on the generated resource-specific bits that correspond to the downlink resources as bundled according to the respective first or second mode to generate l reply bits. The at least one transmitter is configured to transmit the generated l reply bits.

In a third aspect thereof the exemplary embodiments of this invention provide a method comprising: sending an allocation of downlink resources and transmitting data on the allocated downlink resources; responsive to receiving a reply bit that is a negative acknowledgement of the transmitted data, selecting from among at least a first algorithm that bundles the downlink resources in a first mode and a second algorithm that bundles the downlink resources in a second mode based on a pattern of the allocated downlink resources; determining a bundling window and layer combination from the selected algorithm; and retransmitting the data that is the subject of the negative acknowledgement in the allocated downlink resources which are indicated by the bundling window and layer combination.

In a fourth aspect thereof the exemplary embodiments of this invention provide an apparatus comprising receiving means, processing means and sending means. The receiving means is for receiving an allocation of downlink resources and for monitoring the allocated downlink resources on l layers for data, (l is an integer). The processing means is for generating a resource-specific bit for each of the respectively monitored allocated downlink resources, and for selecting from among at least a first algorithm that bundles the downlink resources in a first mode and a second algorithm that bundles the downlink resources in a second mode based on a pattern of the allocated downlink resources, and for using the selected first or second algorithm on the generated resource-specific bits that correspond to the downlink resources as bundled according to the respective first or second mode to generate l reply bits. The sending means is for transmitting the generated l reply bits.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Figure 1:
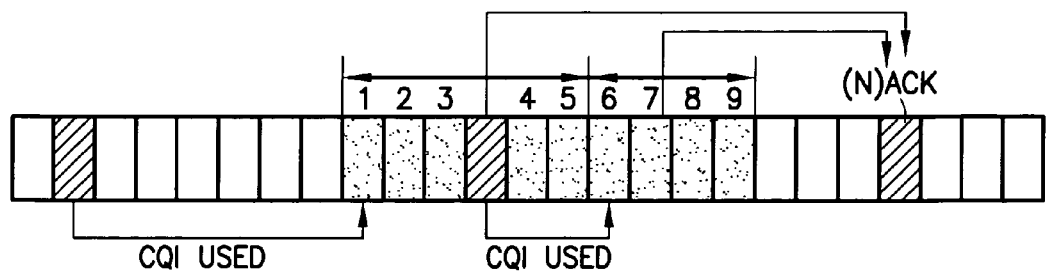
FIG. 1 is an illustration of a sub-bundling principle for TDD configuration #5 for a single-layer UE.

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

It is initially noted that the examples and explanations below are in the context of a LTE network, but embodiments of this invention are not so limited and may be employed in any network protocol, such as for example UTRAN (universal mobile telecommunications system terrestrial radio access network), GSM (global system for mobile communications), WCDMA (wideband code division multiple access, also known as 3G or UTRAN), WLAN (wireless local area network), WiMAX (worldwide interoperability for microwave access) and the like, in which downlink transmissions are multiplexed to different users. Further, the various names used in the description below (e.g., PDCCH, PRB, etc.) are not intended to be limiting in any respect but rather serve as particularized examples directed to specific LTE implementations using current LTE terms for a clearer understanding of the invention. These terms/names may be later changed in LTE and they may be referred to by other terms/names in different network protocols, and these teachings are readily adapted and extended to such other protocols.

As an initial matter, first is detailed the inventors' proposal for LTE for a single layered UE which is used later below to explain basics of the virtual dual-layer ACK/NACK signaling for a dual-layer configured UE according to these teachings.

Single-Layer ACK/NACK Bundling:

ACK/NACK bundling solutions have been decided in order for UE to acknowledge multiple DL assignments with a single ACK in uplink. A 2-bit Downlink Assignment Index (DAI) field has been proposed which provides a good solution for all TDD configurations except for TDD configuration #5 shown in Table 1 below (D=DL, U=UL, S=DL subframe switching from DL to UL).

TABLE 1

| | Uplink-downlink allocations | | | | | | | | | | |
|---|---|---|---|---|---|---|---|---|---|---|---|
| Con-figuration | Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Some modifications to the Downlink Assignment Index can be made to support up to full activity in downlink (e.g. 9 DL assignments for each ACK/NACK bundling window) while still supporting a single ACK bit in uplink. This still causes a large number of retransmissions and thus a reduction of spectral efficiency. It has therefore been proposed in multiple contributions that higher order ACK/NACK be used to improve the performance.

The context is the special case of having 2 ACK bits available; e.g. equivalent to dual layer MIMO ACK/NACK which requires the same PUCCH resource reservation as single layer ACK/NACK although a better link budget. This is the most simple case and with some simple rules for TDD configuration 9DL:1UL, it will be shown that performance can be improved with minimal changes to current LTE procedures.

For TDD configuration #5 of Table 1 there are 9 DL subframes associated with 1 UL subframe. For a single layer configured UE and the 9 subframe ACK/NACK bundling window, first divide it into two sub-bundling windows as illustrated in FIG. 1. A hard-coded split such as that shown in FIG. 1 is then imposed in order to bundle subframes where it is likely that scheduling decisions within the sub-bundling window have been made based on a same CQI report.

Again use the assumption of a single ACK/NACK channel but now use the flexibility of QPSK (quaternary phase shift keying) transmission to allow for larger downlink scheduling flexibility. Denote the ACK/NAK bits as ($b_1$, $b_2$) for each of the two sub-bundling windows shown in FIG. 1 (subframes 1-5 and subframes 6-9). As just one particular example, the transmitted symbols as a function of the ACK/NACK state of each of the sub-bundling windows are shown in Table 2 (an exact constellation mapping can be different without departing from these teachings).

TABLE 2

Example transmission depending on sub-bundling window state.

| 1st sub-bundling window | 2nd sub-bundling window | Transmission on ACK/NACK channel |
|---|---|---|
| ACK | DTX | +1 |
| NACK | DTX | −1 |
| DTX | DTX | 0 |
| ACK | ACK | $(1-j) \cdot \frac{1}{\sqrt{2}}$ |
| NACK | ACK | $(-1-j) \cdot \frac{1}{\sqrt{2}}$ |
| DTX | ACK | −j |
| ACK | NACK | $(1+j) \cdot \frac{1}{\sqrt{2}}$ |
| NACK | NACK | $(-1+j) \cdot \frac{1}{\sqrt{2}}$ |
| DTX | NACK | j |

One design principle is to transmit multiple ACK/NACK bits on a single ACK/NACK channel using PUCCH formats 1a/1b. With this approach, no additional PUCCH resource needs to be reserved for the transmission of multiple ACK/NACK bits.

This approach to single-layer transmission easily re-uses the Downlink Assignment Index definitions for the 4-subframe sub-bundling window and can also be used for the 5-subframe sub-bundling window if limiting the UE to 4/5 dynamic DL assignments in that window. Alternatively, methods proposed for single ACK/NACK for TDD configuration #5 can be used here as well to allow a UE to access 100% of the DL capacity.

Via its UL link adaptation methods, the eNB can for each duplexing period of 10 ms predict if a UE can support 2-bit ACK/NACK so that it can schedule more than 4 DL assignments to a UE. If only "1-bit" ACK/NACK can be supported, the scheduling flexibility is limited to schedule the user in only a single sub-bundling window. By making smart mapping of sub-bundling windows to match CQI latencies, this is expected to be a minor limitation in practice.

Dual-Layer ACK/NACK Bundling:

Now consider the case where the UE is capable of dual layer transmissions, and the DL resources the UE monitors for its data must be ACK/NACK'd on each stream/layer. Embodiments of this invention for dual-layer bundling specify a behavior rule, known in advance to both the eNB and the UE, that determines/dictates how the 2 ACK/NACK bits should be used depending on the received scheduling pattern and the nature of the scheduling pattern for the DL resources over which the data is to be received. Essentially, each DL resource will generate an ACK or NACK. At this point the generated ACK/NACK is not sent, so term each of these bits intermediate bits or resource-specific bits. The UE selects one or another of two different algorithms to logically combine (AND) various ones of those resource-specific ACK/NACKs, and the selection is based on the scheduling pattern of the resource allocation itself. The UE then logically combines the individual ACK/NACK's according to the selected algorithm and only then sends the ACK/NACK that is a single bit representing the logical combination of the bundled resources. Because there are two layers the UE generates two bits, but a single selection based on the DL pattern is used to generate them both.

Figure 2:
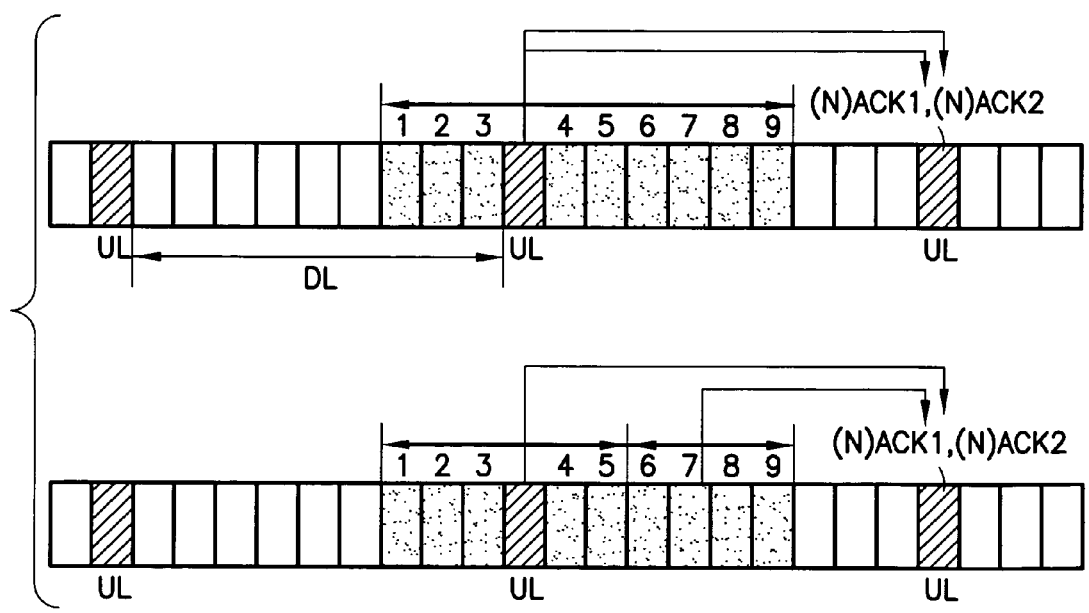
FIG. 2 illustrates at the uppermost timing diagram an illustration of a 'normal' dual-layer transmission and at the lowermost timing diagram a 'virtual' dual-layer transmission according to an exemplary embodiment of the invention.

To illustrate an exemplary embodiment of the invention, consider FIG. 2. Like FIG. 1, this is an illustration of TDD configuration #5 (9DL:1UL) but for a dual layer UE. Note that this example is non-limiting and these teachings may be used generally for all TDD configurations where ACK/NACK bundling is specified (e.g. when DL resources exceed the amount of UL resources). As well these teachings may also be extended to other wireless protocols.

It is useful to first discuss the two ways a UE can use its ACK/NACK bits. As it has been configured (higher layer) to be a dual-layer UE, it always has 2 bits available (QPSK symbol). At the topmost timing diagram of FIG. 2 is shown what is considered for simplicity a default or 'normal' mode. There are nine DL subframes in each of the first and second layer. The UE creates two ACK/NACK bits, one for each of the layers, with each ACK/NACK bit aggregating, using the AND operation, the individual ACK/NACKs the UE determined for each DL subframe. Define as $a_{n,l}$ the ACK/NACK corresponding to subframe n (where n ranges from 1 to 9 DL subframes for the example of FIG. 2) and layer l (where l ranges from 1 to 2 for the dual layer example of FIG. 2). Then the UE creates its two ACK/NACK bits as:

$A_1 = \text{AND}(a_{1,1}, a_{2,1}, a_{3,1}, a_{4,1}, a_{5,1}, a_{6,1}, a_{7,1}, a_{8,1}, a_{9,1})$ $A_2 = \text{AND}(a_{1,2}, a_{2,2}, a_{3,2}, a_{4,2}, a_{5,2}, a_{6,2}, a_{7,2}, a_{8,2}, a_{9,2})$ In this instance the aggregated bit $A_1$ aggregates all the resource-specific ACK/NACK bits in layer 1, and the aggregated bit $A_2$ aggregates all the resource-specific ACK/NACK bits of layer 2. Note that this is a simple logical AND function across all the DL subframes for an individual layer. This is an extension of the single-layer ACK/NACK procedure noted above and so we term this the 'normal' dual-layer configuration in terms of ACK/NACK.

The second mode can also be called sub-bundling but instead we term this as using a 'virtual' dual-layer transmission in terms of ACK/NACK. An example is shown at the lowermost timing diagram of FIG. 2. Like FIG. 1, the sub-bundling splits between subframes 1-5 and subframes 6-9. There are still two layers and so two ACK/NACK bits are transmitted. But in this 'virtual' dual-layer transmission the first bit is aggregated from all the ACK/NACK's of the individual DL resources in both/all layers for a first subset of the allocated DL resources, and the second bit is aggregated from all the ACK/NACK's of the individual DL resources in both/all layers for a second subset of the allocated DL resources (where the first and second subsets do not overlap and fully encompass the whole of the allocated DL resources, consistent with the sub-bundling concept in general). It can be seen that the DL subframes within the bundling window are divided into two parts and for each part is created a separate ACK/NACK. Using the specific example of 5/4 split shown in the lowermost timing diagram of FIG. 2, the two ACK/NACK bits are created as:

$A_1 = \text{AND}(a_{1,1}, a_{2,1}, a_{3,1}, a_{4,1}, a_{5,1}, a_{1,2}, a_{2,2}, a_{3,2}, a_{4,2}, a_{5,2})$
$A_2 = \text{AND}(a_{6,1}, a_{7,1}, a_{8,1}, a_{9,1}, a_{6,2}, a_{7,2}, a_{8,2}, a_{9,2})$ In this instance the aggregated bit $A_1$ aggregates all the resource-specific ACK/NACK bits of all layers (both layers in this example) for only a first sub-set of the subframes (subframes 1-5 in this example), and the aggregated bit $A_2$ aggregates all the resource-specific ACK/NACK bits of all layers for only a second subset of the subframes (subframes 6-9 in this example). Like the 'normal' transmission detailed above this is a simple logical AND function, but unlike that 'normal' algorithm this ACK is across all the layers for a subset of the DL subframes for an individual layer. Said another way, we ACK across the layers and then divide ACK/NACK into the time domain, whereas the 'normal' approach ACKs across all DL subframes and divides the two ACK bits by the spatial domain.

One aspect of this invention is to be able to switch between the reporting modes, i.e. handling how the AND operation is performed. Whether there is 5/4 division or a 4/5 division or any other division of the sub-bundles/window sizes makes no difference to the underlying concept of different aggregations to generate the ACK/NACK for different patterns of DL resources.

For a correct interpretation between the eNB and the UE it is important that the same mode is assumed at both ends of the transmission/reception link. To this end there is a need for a set of standardized rules, so the mode does not need to be signaled explicitly. This can be done by higher layer configuration (e.g., medium access control layer, or some other layer higher than the physical layer). Until that can be adopted for LTE (e.g., Release 9), there is proposed a dynamic rule that automatically selects the best method in a way which is clear without ambiguity to both the eNB and the UE.

To understand one particular motivation behind the invention, it is useful to detail in which situation the two modes are preferred. When we AND the individual ACK/NACKs it is best for the communication system if those individual ACK/NACKs are as correlated as possible. Otherwise there is an unnecessary amount of retransmission ongoing. With that in mind two rules or guidelines are presented:

1. Use the normal dual-layer ACK/NACK method when the DL assignments to the UE are highly correlated in time so that the decorrelation is larger between the two MIMO layers. This is e.g. when UE has been assigned to the very same resources throughout the ACK/NACK bundling window. [the term "very same resources" is detailed below]

2. Use the virtual dual-layer ACK/NACK method when successive DL assignments are not correlated in time and frequency so that ANDing MIMO layers have no real meaning. In this case it is preferred to have the gain of time-distributed ACK/NACK.

The inventors' simulations show that for single-layer transmission the gain from going from the normal to the virtual ACK/NACK method is 11%, so a significant gain is expected for this feature. To this end is detailed a change criterion that is defined so that UE can determine if there is large correlation in time or not. This change criterion is used to identify the "very same resources" noted above. The algorithm that would be used in the UE to determine the ACK/NACK method to use (and also in eNB based on its own created DL assignments so that it can interpret ACK/NACK correctly) is in an exemplary embodiment formulated as follows:

```
IF change criterion exceeded
    USE virtual dual-layer ACK/NACK method.
OTHERWISE
    USE normal dual-layer ACK/NACK method
END
```

This algorithm runs for each full DL bundling window.
The Change Criterion:

In general the virtual dual-layer ACK/NACK method enables a very significant gain potential (e.g. 11% for above case in simulation), and so the change criterion can be made quite aggressive and only facilitate the normal dual-layer ACK/NACK method when the UE is relatively certain that there is a high correlation between the performance of each of the layers throughout the entire bundling period. The change criterion can of course also be configurable by network signaling (e.g., system information, dedicated UE signaling upon handover, etc.) but the more typical case is that the eNB and UE follow some predetermined change criterion that is somewhat persistent if not permanent.

As simple example consider the following reformulation of the above algorithm to clarify the change criteria.

```
IF UE has been scheduled on exactly the same physical resources
    (PRBs) during all active DL assignments inside bundling window
    USE normal dual-layer ACK/NACK method.
OTHERWISE
    USE virtual dual-layer ACK/NACK method
END
```

Of course other implementations of this concept may choose other balances, e.g. "exact" can be re-formulated as "overlapping" requiring that just a single PRB is used in all the DL assignments. This is seen as a bit less aggressive (the extent of how less aggressive depends on the extent of the overlap that triggers the switch between normal and virtual modes, PRBs that are identical across x number of active DL assignments), and as above the inventors' initial simulations show a gain to be exploited by more aggressive use of the virtual mode.

It should be noted that the above definition of "exactly the same physical resources" could be extended to be any combination of:
  PRBs allocated
  MCS selected (for both layers)
  PMI (precoding matrix index) information
  Any various combinations of these can be used to determine the proper correlation between layers so as to employ a change criterion for which maximum gain would be achieved.

Figure 3:
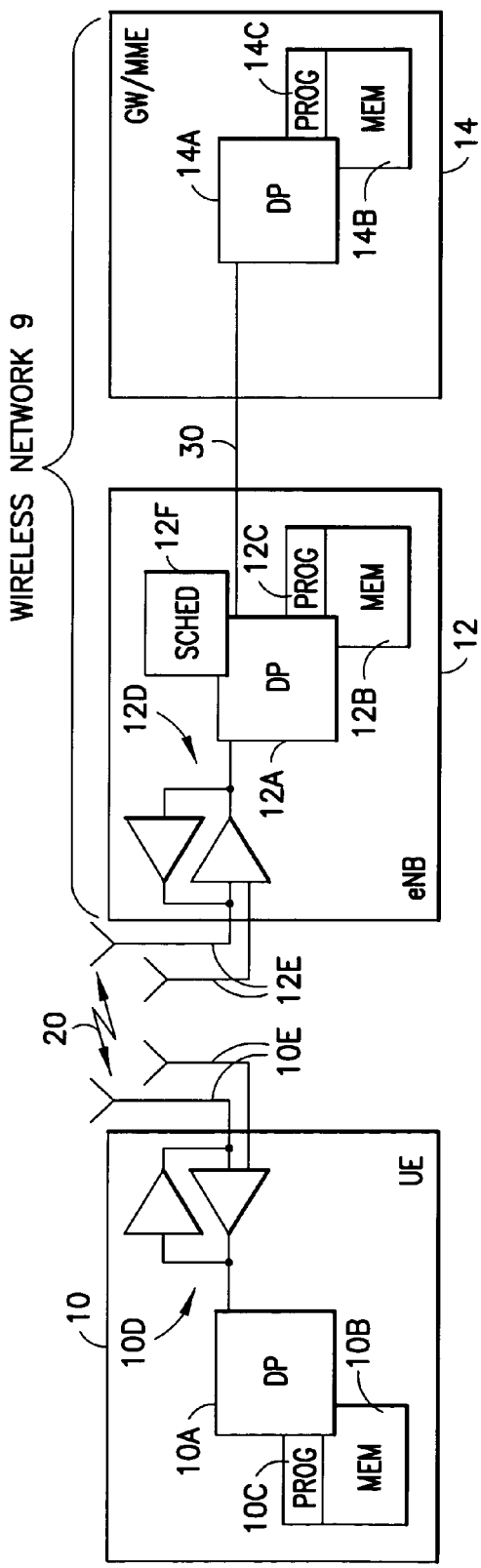
FIG. 3 is a simplified block diagram of various electronic devices that are suitable for use in practicing the exemplary embodiments of this invention.

Reference is now made to FIG. 3 for illustrating a simplified block diagram of various electronic devices that are suitable for use in practicing the exemplary embodiments of this invention. In FIG. 3 a wireless network 9 is adapted for communication between a UE 10 and a Node B 12 (eNB). The network 9 may include a gateway GW/mobility management entity MME/radio network controller RNC 14 or other radio controller function known by various terms in different wireless communication systems. The UE 10 includes a digital processor (DP) 10A, a memory (MEM) 10B that stores a program (PROG) 10C, and a suitable radio frequency (RF) transceiver 10D coupled to one or more antennas 10E (two shown) for bidirectional wireless communications over one or more wireless links 20 with the eNB 12.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The eNB 12 also includes a DP 12A, a MEM 12B, that stores a PROG 12C, and a suitable RF transceiver 12D coupled to one or more antennas 12E (two shown). The eNB 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the eNB 12 over the Iub link 30.

Also within the eNB 12 is a scheduler 12F that schedules the various UEs under its control for the various UL and DL subframes. Once scheduled, the eNB sends messages to the UEs with the scheduling grants (typically multiplexing grants for multiple UEs in one message, such as the PDCH noted above). Generally, the eNB 12 of an LTE system is fairly autonomous in its scheduling and need not coordinate with the GW/MME 14 excepting during handover of one of its UEs to another eNB or an access node of another radio access system.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the eNB 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 4:
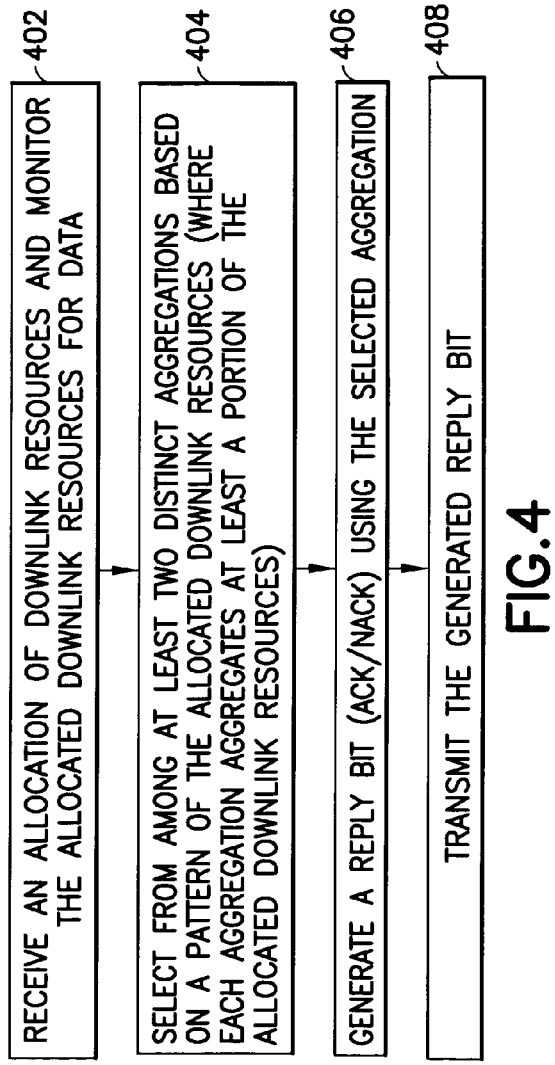
FIG. 4 is a process flow diagram according to an exemplary embodiment of the invention.

According to exemplary embodiments of the invention from the perspective of the UE then and with reference to FIG. 4 there is provided a memory embodying a computer program that is executable by a processor for performing actions directed to sending a reply to allocated downlink resources, and an apparatus and a method that includes at block 402 receiving an allocation of downlink resources and monitoring the allocated downlink resources for data (on l layers for data, in which l is an integer), generating a resource-specific bit for each of the respectively monitored allocated downlink resources, at block 404 selecting from among at least two distinct aggregations based on a pattern of the allocated downlink resources where each aggregation aggregates at least a portion of the allocated downlink resources (e.g., selecting between a first algorithm that bundles the downlink resources in a first mode and a second algorithm that bundles the downlink resources in a second mode), at block 406 generating a reply bit using the selected aggregation (e.g., using the selected first or second algorithm on the generated resource-specific bits that correspond to the downlink resources as bundled according to the respective first or second mode to generate l reply bits), and at block 408 transmitting the generated reply bits (l reply bits).

In accordance with a more particularized embodiment, one of the aggregations is across a single layer for all of the downlink resources and another of the aggregations is for only a portion of the downlink resources across at least two layers. Further and more particularized is that the reply bit is a first reply bit and the single layer is a first layer, and wherein each distinct aggregation generates two bits such that the said one of the aggregations generates a reply bit for all of the allocated resource across each of at least two layers, and the said another of the aggregations generates a reply bit across all of the at least two layers for different subgroups of the downlink resources.

In accordance with another more particularized embodiment, selecting from among at least two aggregations includes selecting between two aggregations, and the selecting is based on a change criterion indicative of how correlated in time are the allocated downlink resources. Further and more particularized is where the change criterion is whether or not the allocated downlink resources comprise at least overlapping or even exactly the same physical resource blocks within a bundling window that is defined by either of the two different aggregations.

In accordance with another more particularized embodiment, the reply bit is an acknowledgement or negative acknowledgement of data received or not received on the allocated resources, and wherein selecting from among at least two aggregations includes selecting between a first aggregation that is a logical AND operation of all acknowledgement or negative acknowledgment bits for all of the allocated resources per layer and a second aggregation that is a logical AND operation of all acknowledgement or negative acknowledgment bits for a subgroup of the allocated resources across multiple layers. Further and more particularized is where the selected aggregation generates two acknowledgement or negative acknowledgement bits for different bundling windows of the allocated downlink resources, one of which is all allocated downlink resources per layer and another of which is different subgroups of the allocated downlink resources across all layers.

From the perspective of the network, the actions are the mirror image of the signalling detailed above: the network sends the allocation and sends data on the allocated downlink resources, and receives the reply bit from the UE. Different from the UE, if the reply bit is an acknowledgement the network does not retransmit any of the data it previously sent on any of the allocated downlink resources. If instead the reply is a negative acknowledgement, the network selects from among at least two distinct aggregations based on the allocation of downlink resources where each aggregation aggregates at least a portion of the allocated downlink resources, determines a bundling window and layer combination from the selected aggregation, and retransmits the data that it sent previously in the allocated downlink resources that are indicated by the bundling and layer combination.

Further in this regard from the network perspective, the network may also send to the UE signalling indicating a changeover point at which one or another of the aggregations are to apply, such as the change criterion detailed above. This may be sent by the MME or other higher network node to the eNB and then signaled to the UE, and is preferably done in signaling in a higher layer than the physical layer (e.g., medium access control layer).

For the aspects of this invention related to the network, embodiments of this invention may be implemented by computer software executable by a data processor of the eNB 12, such as the processor 12A shown, or by hardware, or by a combination of software and hardware. For the aspects of this invention related to the portable devices accessing the network, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   receiving an allocation of downlink resources and monitoring the allocated downlink resources on l layers for data, in which l is an integer;
   generating a resource-specific bit for each of the respectively monitored allocated downlink resources;
   based on a pattern of the allocated downlink resources, selecting from among at least a first algorithm that bundles the downlink resources in a first mode and a second algorithm that bundles the downlink resources in a second mode;
   using the selected first or second algorithm on the generated resource-specific bits that correspond to the downlink resources as bundled according to the respective first or second mode to generate l reply bits; and
   transmitting the generated l reply bits,
   wherein the first algorithm bundles the downlink resources according to each of the l layers such that each $l^{th}$ reply bit is specific to resources only on an $l^{th}$ layer; and the second algorithm bundles the downlink resources in groups of subframes across all of the l layers such that each $l^{th}$ reply bit is specific to resources within an $l^{th}$ group of subframes that spans all of the l layers.

2. The method of claim 1, wherein there are l=2 layers and the selecting is only between the first algorithm and the second algorithm.

3. The method of claim 1, wherein the selecting is further based on a change criterion indicative of how correlated in time are the allocated downlink resources.

4. The method of claim 3, wherein the change criterion is whether or not the allocated downlink resources comprise at least overlapping physical resource blocks within a bundling window that is defined by either of the first algorithm or the second algorithm.

5. The method of claim 3, wherein the change criterion is whether or not the allocated downlink resources are all the same physical resource blocks within the bundling window.

6. A method comprising:
receiving an allocation of downlink resources and monitoring the allocated downlink resources on l layers for data, in which l is an integer;
generating a resource-specific bit for each of the respectively monitored allocated downlink resources;
based on a pattern of the allocated downlink resources, selecting from among at least a first algorithm that bundles the downlink resources in a first mode and a second algorithm that bundles the downlink resources in a second mode;
using the selected first or second algorithm on the generated resource-specific bits that correspond to the downlink resources as bundled according to the respective first or second mode to generate l reply bits; and
transmitting the generated l reply bits,
wherein each of the l reply bits and each of the resource-specific bits is an acknowledgement or negative acknowledgement of data received or not received, and wherein the first algorithm comprises a logical AND operation of all resource-specific acknowledgement and negative acknowledgment bits for all of the allocated resources per $l^{th}$ layer, and the second algorithm comprises a logical AND operation of all resource-specific acknowledgement and negative acknowledgment bits for all of the allocated resources across all of the l layers per $l^{th}$ group of subframes.

7. The method of claim 6, executed by a user equipment in a wireless communications network in which the allocation is received from a network node and the generated reply bits are transmitted to the network node.

8. An apparatus comprising:
at least one processor; and
a memory including computer program instructions, the memory and the computer program instructions being configured to, with the at least one processor, cause the apparatus at least to perform:
receive an allocation of downlink resources and monitor the allocated downlink resources on l layers for data, in which l is an integer;
generate a resource-specific bit for each of the respectively monitored allocated downlink resources;
select from among at least a first algorithm that bundles the downlink resources in a first mode and a second algorithm that bundles the downlink resources in a second mode based on a pattern of the allocated downlink resources;
use the selected first or second algorithm on the generated resource-specific bits that correspond to the downlink resources as bundled according to the respective first or second mode to generate l reply bits; and
transmit the generated l reply bits,
wherein the first algorithm bundles the downlink resources according to each of the l layers such that each $l^{th}$ reply bit is specific to resources only on an $l^{th}$ layer; and the second algorithm bundles the downlink resources in groups of subframes across all of the l layers such that each $l^{th}$ reply bit is specific to resources within an $l^{th}$ group of subframes that spans all of the l layers.

9. The apparatus of claim 8, wherein there are l=2 layers and the apparatus is configured to select between only the first algorithm and the second algorithm.

10. The apparatus of claim 8, wherein the apparatus is configured to select from among at least the first algorithm and the second algorithm based further on a change criterion indicative of how correlated in time are the allocated downlink resources.

11. The apparatus of claim 10, wherein the change criterion is whether or not the allocated downlink resources comprise at least overlapping physical resource blocks within a bundling window that is defined by either of the first algorithm and the second algorithm.

12. The apparatus of claim 10, wherein the change criterion is whether or not the allocated downlink resources are all the same physical resource blocks within the bundling window.

13. An apparatus comprising:
at least one processor; and
a memory including computer program instructions, the memory and the computer program instructions being configured to, with the at least one processor, cause the apparatus at least to perform:
receive an allocation of downlink resources and monitor the allocated downlink resources on l layers for data, in which l is an integer;
generate a resource-specific bit for each of the respectively monitored allocated downlink resources;
select from among at least a first algorithm that bundles the downlink resources in a first mode and a second algorithm that bundles the downlink resources in a second mode based on a pattern of the allocated downlink resources;
use the selected first or second algorithm on the generated resource-specific bits that correspond to the downlink resources as bundled according to the respective first or second mode to generate l reply bits; and
transmit the generated l reply bits,
wherein each of the l reply bits and each of the resource-specific bits is an acknowledgement or negative acknowledgement of data received or not received, and wherein is the first algorithm comprises a logical AND operation of all resource-specific acknowledgement and negative acknowledgment bits for all of the allocated resources per $l^{th}$ layer, and the second algorithm comprises a logical AND operation of all resource-specific acknowledgement and negative acknowledgment bits for all of the allocated resources across a l layers per $l^{th}$ group of subframes.

14. The apparatus of claim 13, wherein the apparatus comprises a user equipment that is configured to transmit the generated l reply bits to a network node.

15. A method comprising:
sending an allocation of downlink resources and transmitting data on the allocated downlink resources;
responsive to receiving a reply bit that is a negative acknowledgement of the transmitted data, selecting from among at least a first algorithm that bundles the downlink resources in a first mode and a second algorithm that bundles the downlink resources in a second mode based on a pattern of the allocated downlink resources;
determining a bundling window and layer combination from the selected algorithm; and
retransmitting the data that is the subject of the negative acknowledgement in the allocated downlink resources which are indicated by the bundling window and layer combination, wherein the first algorithm and the first mode use a first bundling window that comprises all of the downlink resources per layer, and the second algorithm and the second mode use a second bundling window that comprises only a portion of the downlink resources across at least two layers.

16. The method of claim 15, wherein the selecting is from among only the first algorithm and the second algorithm, and is further based on a change criterion indicative of how correlated in time are the allocated downlink resources.

17. The method of claim 15, executed by an access node of a wireless communication network.

18. An apparatus comprising:
at least one processor; and
a memory including computer program instructions, the memory and the computer program instructions being configured to, with the at least one processor, cause the apparatus at least to perform:
send an allocation of downlink resources and transmitting data on the allocated downlink resources;
select from among at least a first algorithm that bundles the downlink resources in a first mode and a second algorithm that bundles the downlink resources in a second mode based on a pattern of the allocated downlink resources in response to receiving a reply bit that is a negative acknowledgement of the transmitted data;
determine a bundling window and layer combination from the selected algorithm; and
retransmit the data that is the subject of the negative acknowledgement in the allocated downlink resources which are indicated by the bundling window and layer combination,
wherein the first algorithm and the first mode use a first bundling window that comprises all of the downlink resources per layer, and the second algorithm and the second mode use a second bundling window that comprises only a portion of the downlink resources across at least two layers.

19. The apparatus of claim 18, wherein the apparatus is configured to select from among only the first algorithm and the second algorithm based further on a change criterion indicative of how correlated in time are the allocated downlink resources.

20. The apparatus of claim 18, wherein the apparatus is an access node of a wireless communication network.

* * * * *